United States Patent [19]

Yamamoto et al.

[11] Patent Number: 4,518,556
[45] Date of Patent: May 21, 1985

[54] METHOD FOR MOLDING BENT PIPES MADE UP OF COMPOSITE MATERIAL

[75] Inventors: Masahiko Yamamoto, Nishinomiya; Yoshinori Nishino, Yamato Takada; Akio Komura, Osaka; Tomio Ebisu, Taishibashi, all of Japan

[73] Assignee: Hitachi Shipbuilding & Engineering Co. Ltd., Osaka, Japan

[21] Appl. No.: 254,051

[22] Filed: Apr. 14, 1981

[30] Foreign Application Priority Data

| | | | |
|---|---|---|---|
| Jul. 1, 1980 | [JP] | Japan | 55-093285[U] |
| Jul. 2, 1980 | [JP] | Japan | 55-093768[U] |
| Jul. 14, 1980 | [JP] | Japan | 55-096498 |
| Aug. 19, 1980 | [JP] | Japan | 55-114357 |

[51] Int. Cl.³ .............................................. B29C 5/04
[52] U.S. Cl. .................................. 264/295; 264/311; 264/314
[58] Field of Search ................ 264/295, 311, 314; 425/389

[56] References Cited

U.S. PATENT DOCUMENTS

| | | | |
|---|---|---|---|
| 3,207,834 | 9/1965 | Geisthoff | 264/295 |
| 3,922,134 | 11/1975 | Kypfrian | 425/389 |
| 4,002,714 | 1/1977 | Usui | 264/295 |

*Primary Examiner*—James Derrington
*Attorney, Agent, or Firm*—Joseph W. Farley

[57] ABSTRACT

A method and apparatus for manufacturing bent pipes of a composite material composed of resin and filling materials such as reinforcing materials and aggregates by employing a cylindrical molding tool which is deformable between straight-axis form and bent-axis form. Materials are supplied into the molding tool held in horizontally straight condition while the tool is rotated about a horizontal axis, and are molded into a pipe by centrifugal molding. Rotation of the tool is stopped when the pipe molded therein is in uncured state, then the tool is subjected to bending. The resulting bent pipe is removed after it is cured. Before the tool is bent, a bag made of a flexible sheet material is inserted into the pipe and inflated to straighten out the inner periphery of the pipe so as to protect the pipe from any possibility of deformation during bending operation. The molding tool is preferably made of such resilient material as rubber, is incased in a peripherally divisible frame or bellows-type flexible frame which, in turn, is suitably incased in a rotary frame. More preferably, the molding tool has a hollow space provided between its inner and outer walls; by filling liquid in the hollow space it is possible to achieve fine roundness in pipe molding irrespective of dimensional errors with the molding tool or frame.

17 Claims, 20 Drawing Figures

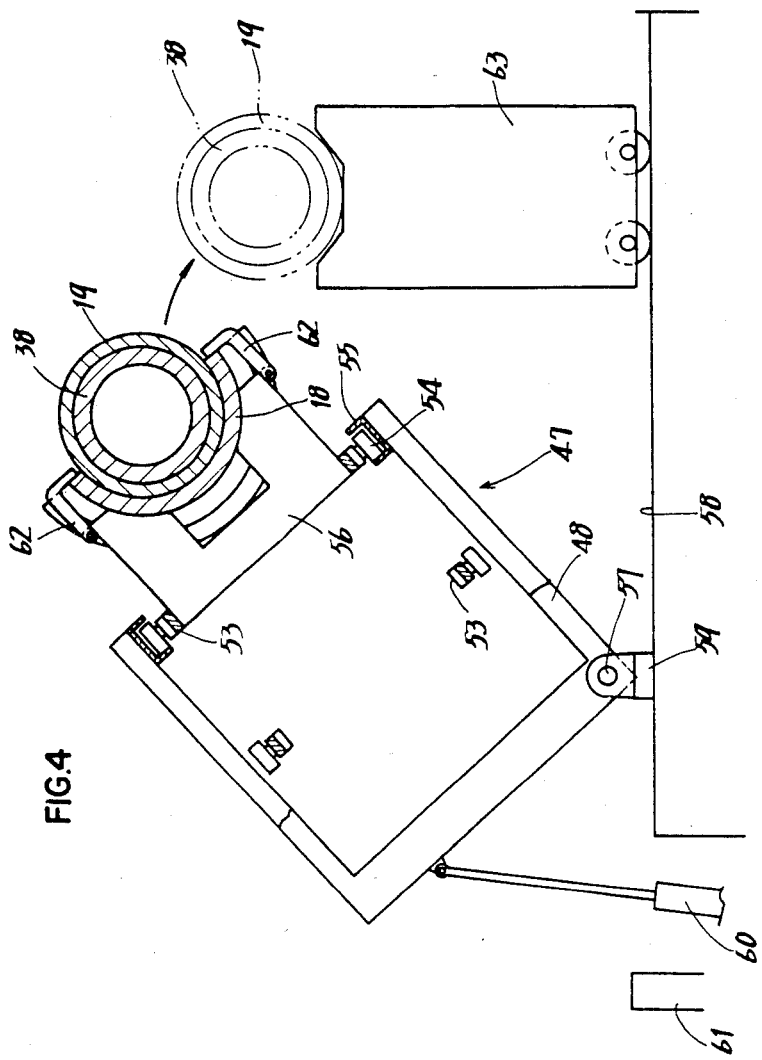

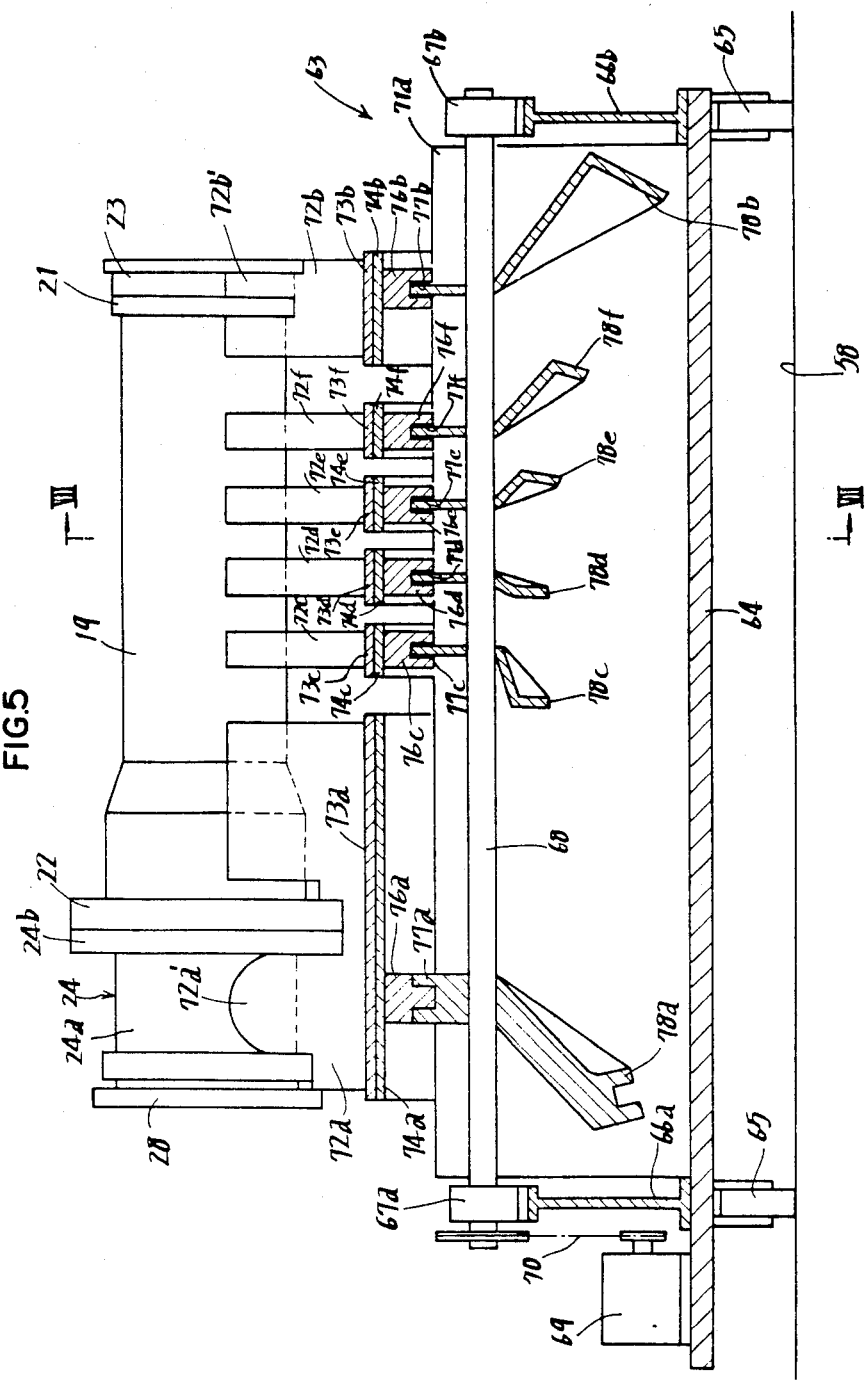

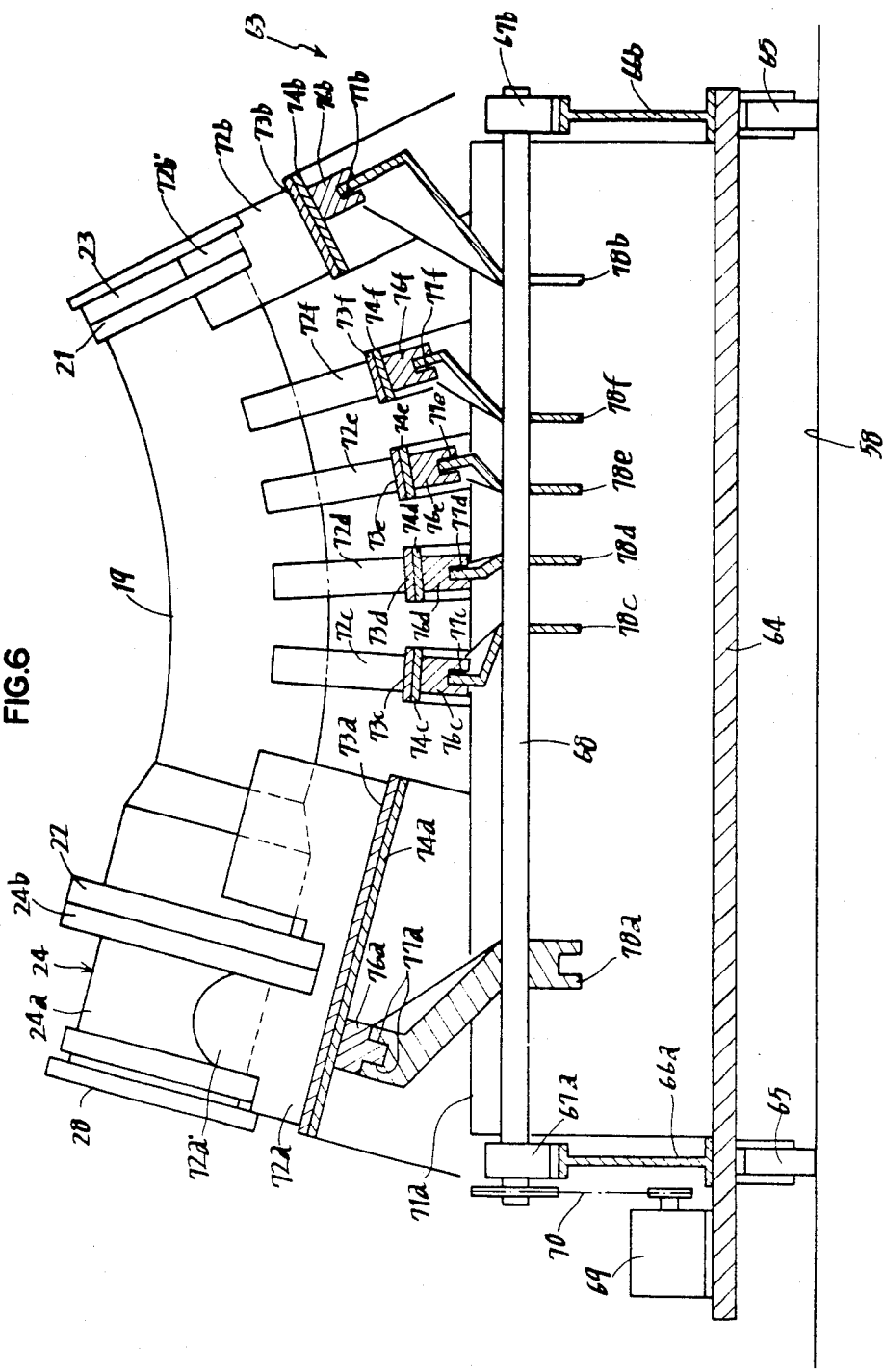

METHOD FOR MOLDING BENT PIPES MADE UP OF COMPOSITE MATERIAL

The present invention relates to a method and apparatus for manufacturing bent pipes made up of a composite material and, more particularly, to a method and apparatus for manufacturing such bent pipes wherein a pipe made up of a composite material containing resin and filling materials such as reinforcing material and aggregates is molded by centrifugal molding and the resulting pipe is bent when it is in uncured state.

In recent years there has been considerable improvement in the quality of pipes made of such composite material as above mentioned. Improvement has also been achieved in production efficiency so that such pipes can be manufactured at comparatively low costs. As a result, such pipes are now widely used in various types of pipe arrangements. In the manufacture of bent pipes, however, the difficulty is that such an efficient method as is presently employed in manufacturing straight pipes cannot be applied. Conventional method for manufacturing bent pipes is such that a mandrel adapted to the shape of the bent pipe to be manufactured is employed, with some resin—impregnated reinforcing material wrapped around the outer periphery of the mandrel, or a mixture of resin and filling materials such as reinforcing material and the like is filled between an inner mold and an outer mold. As such, production efficiency for bent pipes has been very poor, with the result of high production cost.

It is therefore the primary object of this invention to provide a method and apparatus for manufacturing bent pipes made up of a composite material in efficient manner. A basic idea considered in the invention in achieving said object is that a straight pipe made up of a composite material is molded by centrifugal molding, then the molded pipe is formed into a bent pipe by bending it when it is in uncured state. However, if the centrifugally molded pipe is removed as such in uncured state and subjected to bending, the sectional configuration of the pipe cannot be properly maintained and therefore no bent pipe suitable for use can be obtained. The invention incorporates a solution to such technical problem to achieve the above said primary object.

In order to achieve the object, the invention provides a method for manufacturing bent pipes comprising the steps of: rotating around a straight horizontal mandrel a substantially cylindrical molding tool adapted to be deformed between a straight-axis profile and a bent-axis profile, feeding materials into said molding tool, bending said tool when a pipe made up of said materials therein as molded by centrifugal molding is in uncured state, and removing the resulting bent pipe from said tool after the pipe having been allowed to harden. By molding a straight pipe by centrifugal molding using such deformable molding tool, then bending the pipe and the tool altogether as the former is retained in the latter, as above mentioned, it is possible that the sectional configuration of the pipe can be well maintained during the bending operation. Thus, bent pipes with precision tolerances can be effectively obtained by utilizing centrifugal molding technique.

The invention also provides an apparatus for manufacturing bent pipes comprising a substantially cylindrical molding tool adapted to be deformed between a straight-axis profile and a bent-axis profile, means for releasably holding said molding tool in position, axially straight, rotation means for rotating said tool, held straight, around a horizontal mandrel, and bending means for bending said tool when it is released from said rotation means.

Said rotation means preferably consists of a cylindrical rotary frame adapted for rotation about the horizontal mandrel and the inner periphery of which serves as means for holding the axis of the molding tool straight. Alternatively, however, the rotary frame, which is adapted to enclose or receive the molding tool, may be in the form of bellows and means for limiting the movement of the bellows in the axial direction may be provided which can be used as means for holding the axis of the molding tool straight.

In a preferred embodiment of the invention, a bag made of a flexible sheet material is inserted in a centrifugally molded pipe and inflated with pressurized air or gas so as to be pressed against the inner wall of the pipe before the molding tool is bent, so that the inner wall surface of the pipe may be straightened out and the sectional configuration of the pipe may be positively prevented from any possible deformation during bending operation. More preferably, an absorbent material layer is provided on the outer surface of the bag to eliminate air—or gas—bubbles which may develop on the inner wall surface of the pipe.

In another preferred embodiment of the invention, the molding tool is made of a resilient material such as rubber and between the inner and outer walls of the tool there is provided a hollow space adapted to be filled with liquid during centrifugal molding operation. Even if any dimensional distortion or eccentricity is present in the tool or frame, by the arrangement it is possible to achieve complete roundness of the tool interior in the course of centrifugal molding operation and thus to obtain pipes having uniform wall thickness. Another advantage of the arrangement is that during pipe removing operation it is possible to broaden the inner diameter of the molding tool by discharging the liquid content of the hollow chamber through some pressure imparted to the tool interior, and thus to draw the pipe out of the tool easily.

In still another preferred embodiment, between the rotary frame and the molding tool made of a resilient material there is interposed a circumferentially multidivisible intermediate frame or a bellows-like flexible intermediate frame composed of a plate material pieces continuously wound in spiral pattern. This arrangement has the advantage that any deformation which may otherwise be caused to the resilient molding tool when the tool is drawn out of the rotary frame can be positively prevented. More particularly, where a flexible intermediate frame is employed, it is possible that bending operation is performed while the resilient tool is held in the intermediate frame, so that the sectional configuration of the tool and, accordingly of the pipe, can be safely retained as it is during bending operation. When drawing out the pipe, the constraint of the resilient tool can be easily removed by twisting the intermediate frame in the direction opposite to that of the plate material winding, and accordingly, pipe removal can easily be done.

For the purpose of bending operation, any known method may be employed, including one where pressing is effected between a top force and a bottom force, or another where the tool is supported at both ends and at an intermediate position, then the support points being changed as required.

Other features and advantages of the invention will be apparent from the following description of preferred embodiments with reference to the accompanying drawings in which:

FIG. 4 is a side view partly in section of the molding tool being delivered from the conveyor on to a bending means;

FIG. 5 is an elevational view partly in section of the bending means, showing the molding tool being received and held in position;

FIG. 6 is a view similar to FIG. 5, showing conditions after bending operation;

Figure 1:
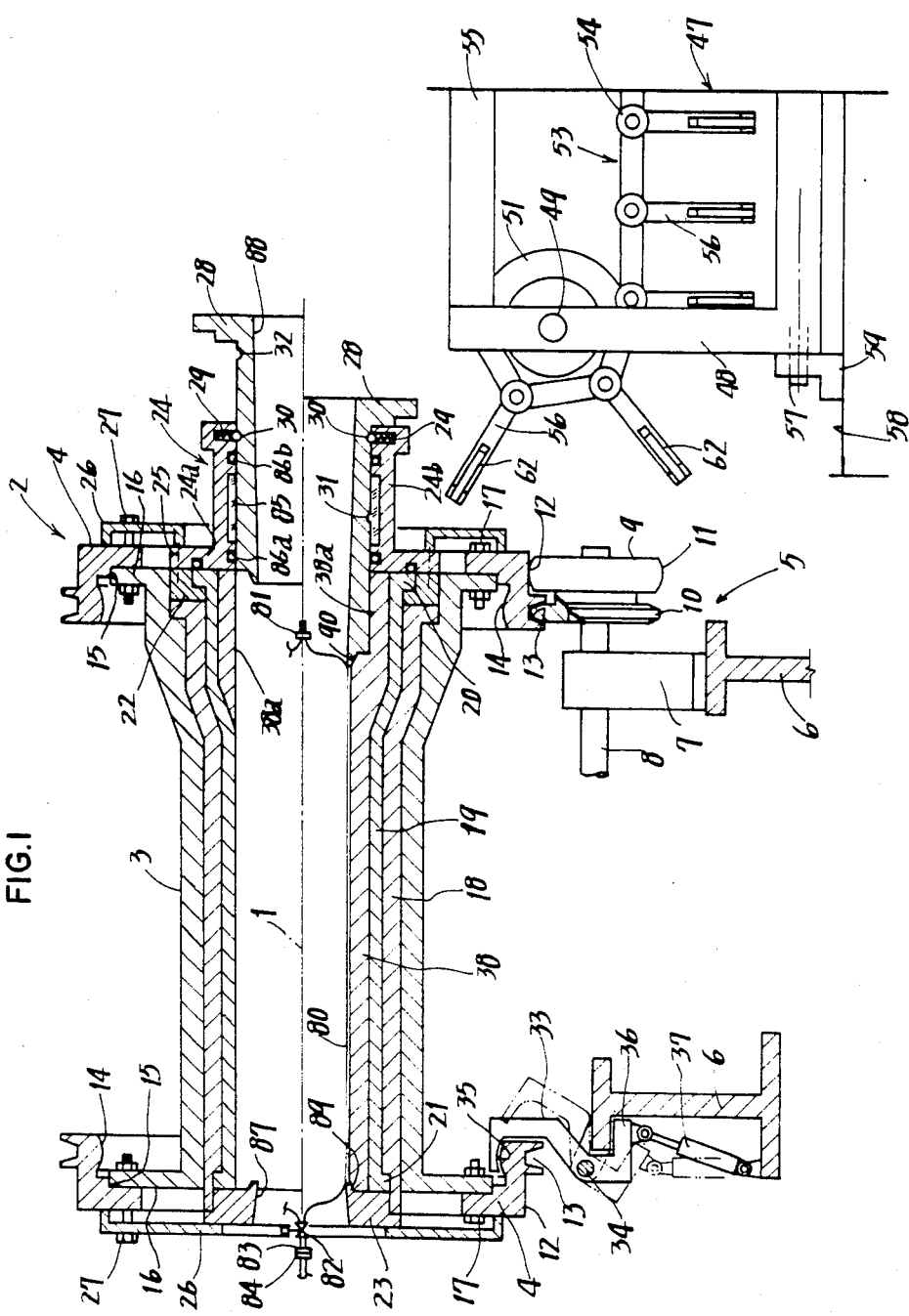
FIG. 1 is a longitudinal sectional view in elevation of a centrifugal molding apparatus, with the upper half portion above the axis of rotation representing what is seen when the faucet portion of a pipe is being formed and the lower half portion representing what is seen when a pipe has been molded.

Referring to FIGS. 1 to 7, inclusive, there is shown therein a manufacturing apparatus representing the first embodiment of the invention. In FIG. 1 a rotary frame 2 rotatable around a horizontal mandrel 1 comprises a cylindrical body 3 and annular members 4 mounted thereon at both ends thereof, resting on rotation drive means 5, which comprise a rotary shaft 8 supported by a pair of fixed frames 6 through bearings 7, wheel members 9 mounted to the rotary shaft 8 at both ends thereof, an annular projection 10 integrally attached to each of the wheel member 9 at one side thereof, and drive mechanism (not shown) adapted to transmit power to the rotary shaft 8. The wheel member 9, on it outer periphery, has a surface of circular-arc configuration 11. On the outer periphery of the annular member 4 there is defined a surface of contact 12 for rolling engagement with the wheel member 9, and at one side of the rolling contact surface 12 there is provided a circumferential groove 13 with which the annular projection 10 mates. Each annular member 4 is also provided with an annular convex surface 14 located radially inwardly of the circumferential groove 13. The two opposed annular members 4 have annular indented portions 15, one each, on their opposed sides. At both ends of the cylindrical body 3 there are provided outwardly projecting ring portions 16 integral therewith. The ring portions 16, each closely fitted in the annular indented portions 15, are fixed to the annular members 4 by fixing elements 17 at a plurality of locations in the circumferential direction. At 18 there is shown an intermediate frame which is received in and held in position by the cylindrical body 4. The intermediate frame 18 is divisible into a plurality of separate parts (divisible into two) and made of aluminum, for example. Shown at 19 is a resilient molding tool which is received in and held in position by the intermediate frame 18. The resilient molding tool 19, made of such elastic material as fluoro rubber, silicone rubber or urethane rubber, has circumferentially outwardly projecting collars 20, 21 formed at both ends thereof. The collar 20 on the faucet side of the pipe to be molded is in engagement with a press ring 22 and the collar 21 on the spigot side of the pipe to be molded is in engagement with a stepped portion of the intermediate frame 18. At the spigot-side end of the intermediate frame 18 there is mounted an end jig 23 adapted for passage through the cylindrical body 3. At the faucet-side end also there is provided an end jig 24, which includes a collar portion 24a to be fixed to the press ring 22 through a fixing member 25 and a tubular portion 24b formed integrally with the collar portion 24a and extending from the inner peripheral portion thereof in the axial direction over some distance at one side of the intermediate frame. The two end jigs 23, 24, each is fixed in position by holding a keep plate member 26 over one side of the jig 23 or 24 and over one side of the annular member 4, then clamping together the keep plate member 26, annular member 4 and ring portion 16 by clamping members 27 at a plurality of locations in the circumferential direction. Shown at 28 is a tube-shaped interior molding means which is fitted in the end jig 24 on the faucet side and movable in the axial direction of the mandrel 1 and which is adapted to mold the faucet interior when it is projected from the end jig 24 and inwardly relative to the molding tool 19. In the tubular portion 24b of the end jig 24 there is provided a ball 30 which is axially inwardly urged by a spring 29, and on the outer peripheral surface of the interior molding means 28 there are provided two recesses 31, 32 in spaced apart relation in the axial direction of the mandrel 1, said recesses being so adapted that the ball 30 is elastically received therein. The locations of the recesses 31, 32 are calculated so that the ball 30 fits in the recess 31 when the inner-side end of the end jig 24 is aligned with the inner-side end of the interior molding means 28 and the all 30 fits in the recess 32 when the interior molding means 28 covers the inner periphery of the faucet. Shown at 33 is a pivotable control lever which at a middle point is secured to one side of the fixed frame 6 through a horizontal pin 34. The upper end of the control lever 33 bends toward one side and the underside of the bent top portion thereof is concaved for contact with the convex surface 14 of the annular member 4 so that it serves as a control surface 35. The lower end of the control lever 33 bends toward the other side. This bent portion serves as a locking means relative to the fixed frame 6. A cylinder 37 for swinging the control lever 33 is provided between the locking means 36 and the fixed frame 6. Shown at 80 is a bag consisting of a film-tube of such solvent-resistant material as paraffin-added silicone rubber or fluororubber. The bag 80, at one end, is blocked off by a fastener 81, and on the other-end side thereof, there is provided a coupler element 83 for receiving pressurized air or gas through a stop valve 82. The coupler element 83 is connectable with another coupler element 84 provided adjacent the rotary frame 2, the latter coupler element communicating with a source of air supply (not shown). There are also suitably provided means (not shown) for inserting the bag 80 into the molding tool after completion of a cycle of centrifugal molding operation.

Figure 8B:
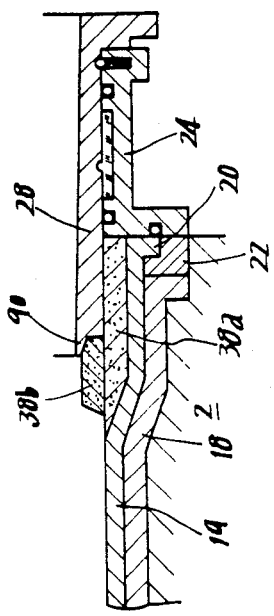
FIGS. 8a–8d are longitudinal sections showing important aspects of various stages of centrifugal pipe molding process.
Figure 8A:
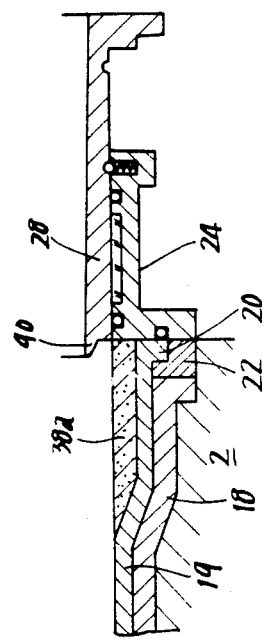
Figure 8C:
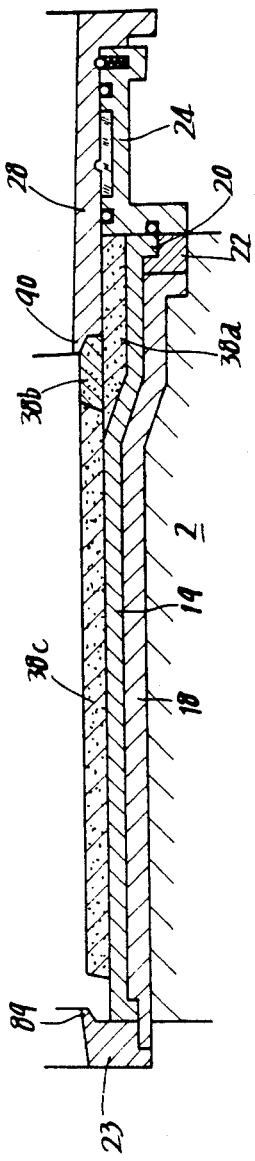
Figure 8D:
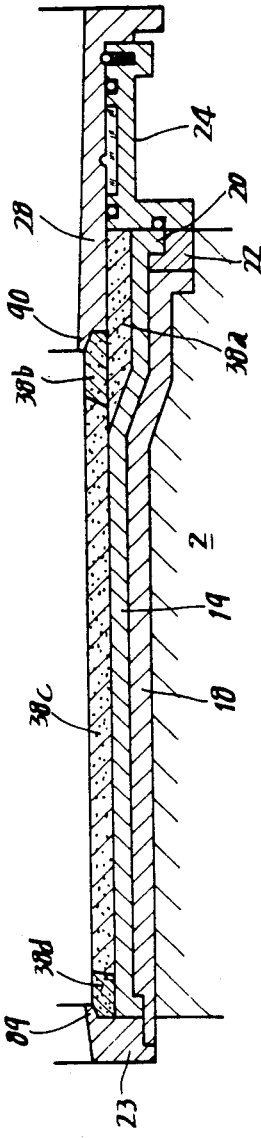

The manner of pipe molding operation by means of the centrifugal molding apparatus above described will now be explained. When the internal molding means 28 is positioned outside the molding tool 19 and held in that position by the ball 30 received in the recess 31, as shown in FIG. 1 and more particularly that portion thereof which is seen above the axis of rotation, the rotation drive means 5 are actuated to rotate the molding tool 19, together with the rotary frame 2, about the mandrel 1. Then, through a hole which centrally extends through the end jig 23 or 24 are fed filling materials such as reinforcing fibers and sand into the molding tool 19 at the faucet molding portion thereof. Likewise, a medium-rate curing resin liquid comprising a mixture of accelerator-added resin and catalyst is supplied. In this way, the faucet 38a of a pipe 38 is molded, as FIG. 8a illustrates. After that the interior molding means 28 is pushed in. The position at which the interior molding means 28 is pushed in is maintained by the ball 30 being received in the recess 32. Again, filling materials are supplied on to that inner peripheral portion of the faucet forming resin 38a which is not covered by the interior molding means 28, then a fast-curing resin liquid comprising a mixture of accelerator-coaccelerator added resin and catalyst is supplied; and a stepped portion 38b of the faucet is molded by centrifugal molding, as FIG. 8b illustrates. Then, over the inner periphery of the molding tool 19 between the faucet's stepped portion 38b and a point adjacent the spigot side end are supplied filling materials and also a relatively low-rate curing resin liquid comprising a mixture of accelerator-added resin and inhibitor-added catalyst, for molding a body portion 38c by centrifugal molding, as FIG. 8c illustrates. Next, filling materials and fast-curing resin liquid are supplied on to the remaining part of the inner periphery of the molding tool 19 in same manners as is the case with the faucet's stepped portion 38b and a spigot portion 38d is molded by centrifugal molding as FIG. 8d illustrates. By doing this way it is possible that the faucet 38a cures at ordinary rate, the faucet's stepped portion 38b and spigot 38d cures or gels soon after the materials are fed, and the body portion 38c cures relatively slowly. Therefore, when the pipe is removed after molding operation, the faucet 38a, faucet's stepped portion 38b, and spigot 38d are found to have cured, and the body portion 38c is in a gelled condition. By allowing the resin-rich portions such as pipe ends and corners to cure fast it is possible to eliminate possibilities of cavity or void formation due to run-off of resin after rotation stops. Subsequent bending is carried out with respect to the body portion 38c of the pipe. If said resin liquid is a general-purpose resin, e.g. unsaturated polyester resin, preferably cobalt naphthenate and cobalt octoate are used as accelerators; dimethylaniline as co-accelerator; methyl ethyl ketone peroxide as catalyst; and hydroquinone as inhibitor.

When pipe molding is completed, rotation of the rotary frame 2 is stopped; then, as can be seen from FIG. 1, a bag 80 is inserted into the molding pipe 38 by some suitable means and inflated by injecting pressurized air thereinto so that it is pressed against the inner periphery of the pipe 38. After that, stop valve 82 is closed and coupler elements 83 and 84 are separated from each other. Thus, the interior of the pipe is straightened out by the bag 80. It is also noted that in this way the pipe may be protected against any deformation of its sectional configuration that may otherwise occur during subsequent bending operation.

For reference, in FIG. 1 numeral 85 designates a mold lubricant chamber defined by the inner periphery of tubular portion 24b of the end jig 24, and with seals 86a, 86b provided adjacent thereto; the lubricant chamber 85 protects the interior molding means 28 from being rendered inoperable by resin. The inner peripheries of both end jig 23 and interior molding means 28 are tapered (87, 88) toward their respective ends facing the molding tool 19 so that any fraction of material dropped thereon can be discharged outward by centrifugal force. Further, the end jig 23 and interior molding means 28, at their respective ends facing the molding tool 19, have annular projections 89, 90 projecting into the molding tool 19, said projections serving to prevent burr occurrences at corner areas.

Figure 2:
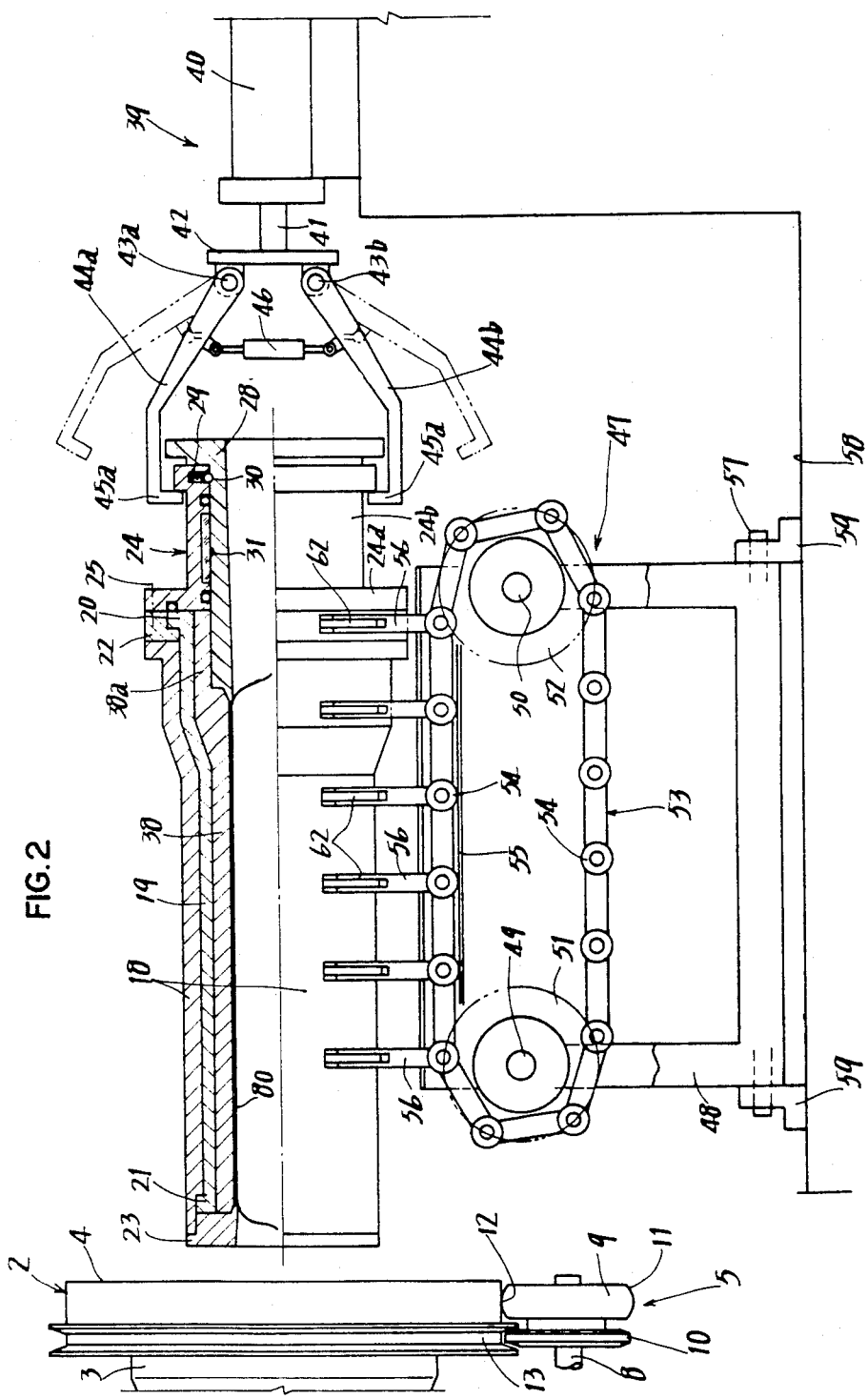
FIG. 2 is an elevational view partly in section showing an intermediate frame and a molding tool, both drawn from a rotary frame on to a conveyor.
Figure 3:
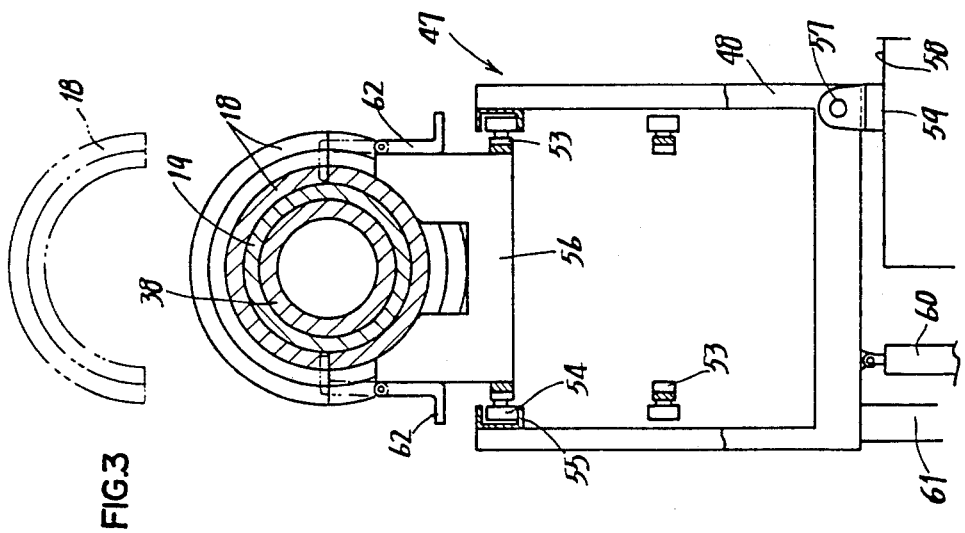
FIG. 3 is a transverse section in side elevation of FIG. 2.

Next, means for removing the intermediate frame 18 and molding tool 19 from the rotary frame 2 will be explained with reference to FIGS. 2 to 4. Shown at 39 is draw means for drawing the intermediate frame 18 from the rotary frame 2 by gripping the end jig 24 coupled to the intermediate frame 18. The draw means include cylinder means 40 disposed on an extension line of said axis of rotation or mandrel 1, a plate member 42 attached to the front end of a piston rod 41 of the cylinder means 40, a pair of swing arms 44a, 44b mounted to the face of the plate member 42 through pins 43a, 43b, locking members 45a, 45b consisting of the inwardly bent front portions of the swing arms 44a, 44b, and cylinder means 46 for actuating the pair of swing arms 44a, 44b to move close to and away from each other. Shown at 47 is conveyer means provided between the rotary frame 2 and the draw means 39 to receive the intermediate frame 18 drawn by the draw means 39 from the rotary frame 2. The conveyor means 47 include a pair of rotation shafts 49, 50 supported on a frame 48 and disposed in spaced apart relation in the direction of draw out, pairs of chain rings 51, 52 mounted to the rotation shafts 49, 50, one pair for each shaft, a pair of roller chains 53 trained over the chain rings, 51, 52, rails 55 mounted on the frame 48 for guiding the rollers 54 of the roller chains 53, and receiving plates 56 of concave shape mounted between the roller chains 53 along their path of movement on the rails 55, said receiving plates being disposed at certain intervals in the longitudinal direction of the chains 53. Each receiving plate 56, at the upper portion thereof on each side, is provided with a pivotable latch piece 62. At the lower portion of the frame 48, on one side thereof, there is provided a rocking shaft 57 extending through the frame 48 and positioned in parallel relation to the mandrel 1, said shaft 57 being rotatably supported by brackets 59 on the floor 58. A cylinder means 60 for swinging the frame 48 is provided between the other-side lower portion of the frame 48 and the floor 58. Shown at 61 is a stopper for stopping the other end of the frame 48. Numeral 63 designates bending means to which the molding tool removed is to be delivered.

The operation of the draw means will now be explained. When the rotation of the rotary frame 2 is stopped with the pipe 38 molded by the centrifugal molding apparatus, the clamping means 27 are disengaged and the keep plate members 26 are removed so that the intermediate frame 18 may be drawn out. Then, the cylinder means 40 is stretched out while the swing arms 44a, 44b are kept apart from each other, and the swing arms 44a, 44b are positioned outwardly apart from the end jig 24. The swing arms 44a, 44b are brought nearer to each other by causing the cylinder means 46 to contract, whereby the locking members 45a, 45b of the swing arms 44a, 45b are caused to engage the end jig 24. Then, by causing the cylinder means 40 to further contract, the intermediate frame 18 is drawn from the rotary frame 2 together with the end jig 24, the molding tool 19 and pipe 38. The intermediate frame 18 is caught by the receiving plates 56 on the conveyor means as it is drawn out. In this connection, the force produced in drawing the intermediate frame 18 may be utilized in actuating the conveyor means 47 to move, or alternatively the conveyor means may be moved by forced drive. As FIG. 2 shows, the intermediate frame 18 drawn from the rotary frame 2 is thus completely received by the conveyor means 47. Subsequently, the cylinder means 46 is caused to stretch to displace the arms 44a, 44b further away from each other, as illustrated by broken line in FIG. 2. Then, as shown by broken line in FIG. 3, the upper half portion of the divisible intermediate frame 18 is hauled up by means of a hoist or the like (not shown), while the lower half portion is secured by means of latch pieces 62. Subsequently, as shown by full line in FIG. 4, the conveyor 47 is caused to swing about the rocking shaft 57 through the frame 48, whereby the molding tool 19 and the pipe 38 in it are passed from the lower half portion of the intermediate frame 18 on to the bending means 63, as illustrated by broken line in FIG. 4.

Figure 7:
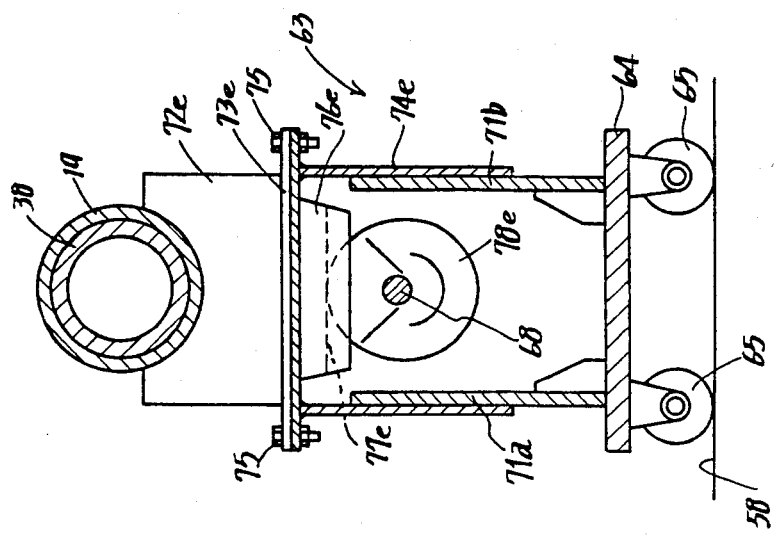
FIg. 7 is a section taken on line VII—VII of FIG. 5.

Nextly, the bending means 63 will be described with reference to FIGS. 5 to 7, inclusive. The bending means 63 is of a truck type, and therefore has a bed plate 64 which, at the underside thereof, is provided with a plurality of wheels. On the bed plate 64 there are mounted a pair of frames 66a, 66b in spaced apart relation in the axial direction of the molding tool 19. Between the upper end portions of these frames 66a, 66b a cam shaft 68 is horizontally supported through bearings 67a, 67b. The cam shaft 68 is interlockingly connected through an endless transmission mechanism to a motor 69 mounted on the bed plate 64. On the bed plate 64 at both sides thereof there are also provided a pair of side plates 71a, 71b which extend upwardly from the base of the bed plate 64 and are disposed in parallel relation to the axis of the molding tool 19. Shown at 72a is a concave-shaped supporting block which supports the end jig 24 from below. Similarly, shown at 72b is a concave-shaped supporting block which supports the end jig 23 from below. The supporting blocks 72a, 72b have engagement members 72a', 72b' which serve to prevent the movement of the end jigs 24, 23 in the axial direction. Reference numerals 72c, 72d, 72e, 72f designate concave-shaped supporting blocks which support the molding tool 19 from below at several points. The supporting blacks 72a-72f are individually secured to base plates 73a-73f, which are in turn replaceably clamped to gate structures 74a-74f by clamping elements (bolts and nuts). Side-plate portions of the gate structures 74a-74f are in engagement with the outer surface of the side plates 71a, 71b so that the gate structures 74a-74f are prevented from turning movement, while they are movable up and down, and back and forth. At the underside of the base plates of the gate structures 74a-74f there are individually mounted operative blocks 76a-76f which have cam grooves 77a-77f respectively. A plurality of cam plates 78a-78f engaging these cam grooves 77a-77f are mounted to the cam shaft 68. These cam plates 78a-78f are adapted to move the operative blocks upward and downward while causing them to swing.

Constructed as above described, the bending means 63 receive the molding tool 19 when all the supporting blocks 72a-72f are horizontally held in position through the engagement of the cam plates 78a-78f with the operative blocks 76a-76f. The molding tool 19 is received in such a way that it is supported by means of the concave surface of the supporting blocks 72c-72f, while the end jigs 24, 23 are supported by means of the concave surface of the supporting blocks 72a, 72b when the engagement members 72a', 72b' of the supporting blocks 72a, 72b are in engagement with the end jigs 24, 23. When such state is reached, the motor 69 is actuated to rotate the cam plates 78a-78f through the cam shaft 68. As the peculiar configuration of the cam plates 78a-78f acts upon the cam grooves 77a-77f, the supporting blocks 72a-72f are displaced through the operative blocks 76a-76f, gate structures 74a-74f, and base plates 73a-73f, whereby the pipe 38 is bent in conjunction with the molding tool 19, as illustrated in FIG. 6. After bending operation, the molding tool 19 may be delivered to next stage for curing, for example, and after curing the pipe is removed from the tool 19.

Figure 9:
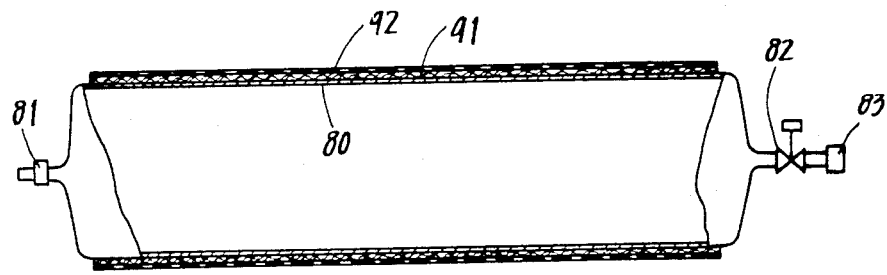
FIG. 9 is an elevational view partly in section of an improved bag.

Referring to bag 80, which, in FIG. 1, is shown as being composed of film tube only, it is preferable that, as shown in FIG. 9, a tubular absorbent layer 91 consisting of corrosion-resisting fiber such as cotton or polyester or flexible, corrosion-resistant porous material is provided on the outer periphery of the bag 80 and further a porous film 92 consisting of any of such solvent resistant materials as polyethylene, polyester and nylon is laid over the outer periphery of the absorbent layer 91. The reason is that the interior of a centrifugally molded pipe 38 is uncured state is often subject to presence of air bubbles, and more especially a pipe made up of a composite material containing reinforcing fibers is liable to the occurrence of many bubbles due to the rise of such fibers when the rotation of the rotary frame 2 is stopped, which fact necessitates the removal of such bubbles, i.e., deaeration. If a bag 80 made of film tube only is inflated in one operation, an air layer may be formed between the inner periphery of the pipe and the film tube, with the result that air may enter into the wall of the pipe. On the other hand, however, if an absorbent layer 91 is provided, as FIG. 9 indicates, when the bag 80 is inflated and pressed against the inner wall of the pipe 38, the air caused to move toward the inner wall by the squeezing effect of the bag 80 is allowed to pass through the holes of the porous film 92 into the absorbent layer 91, so that no air bubble may be present in the interior of the pipe 38 and air bubble caused, if any, may be crushed to disappear.

Figure 10:
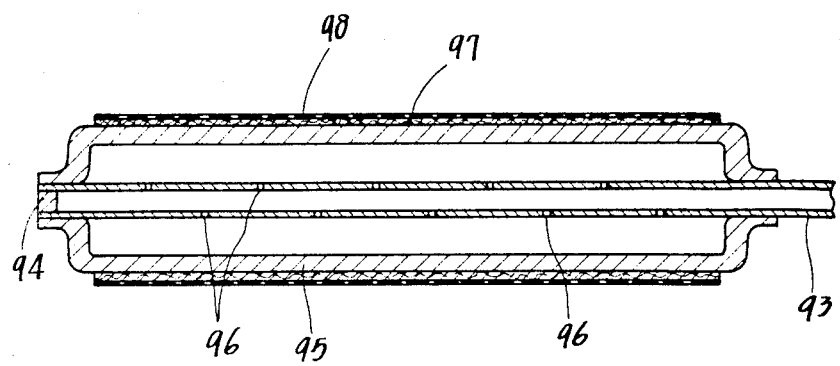
FIG. 10 is a longitudinal section in elevation of another modified form of bag.

The construction of the bag may not be limited to those shown in FIGS. 1 and 9. For example, the one shown in FIG. 10 may be employed. Referring to FIG. 10, a pressurized-air supply pipe 93 is provided which is adapted for insertion into the molding tool 19 after passage over the axis of rotation 1 of the rotary frame 2, one end of the supply pipe 93 being stopped by a stopper 94 and the other end communicating to a pressurized air supply source (not shown). A bag 95 is fitted over the outer periphery of the supply pipe 93, both ends of the bag 95 being air-tightly secured to the supply pipe 93 which is provided with a plurality of bored holes 96 communicating between the interior passage of the pipe 93 and the bag 95 and suitably spaced apart from one another. Over its outer periphery the bag 95 is provided with a absorbent layer 97 and a porous film 98, both similar to those in FIG. 9. When this type of bag is employed, the insertion thereof into the molding tool 19 may be performed by means of the supply pipe 93. If the angle of bending of the pipe 38 is substantial, it is necessary that the supply pipe 93 should be of such type that can suitably support the bag 95 and has good flexibility.

Figure 11:
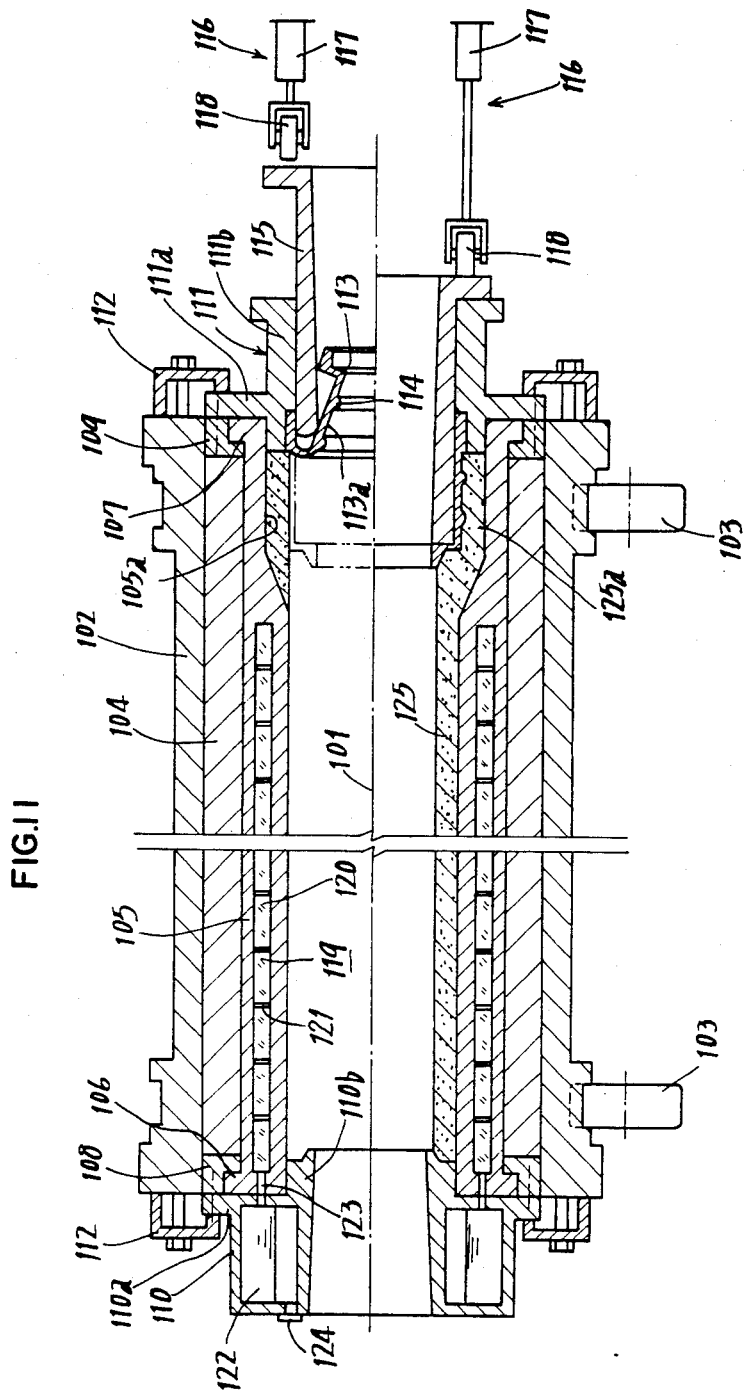
FIG. 11 is a longitudinal view in elevation of another form of centrifugal molding apparatus.

In FIG. 11 there is shown another form of centrifugal molding apparatus, in which there is provided a rotary frame 102 supported by a plurality of rollers 103 for rotation about a horizontal axis of rotation 101, driving force for rotation of the frame 102 being supplied by the rollers 103. Shown at 104 is a circumferentially multi-divisible intermediate frame which is incased in the rotary frame 102, and shown at 105 is a resilient molding tool made of a resilient material such as fluororubber, silicone rubber, urethane rubber or the like and which is incased in the intermediate frame 104, the molding tool 105 being provided, on the outer periphery thereof at both ends, with collars 106, 107. Numerals 108, 109 designate press rings which engage the rotary frame 102 at both end portions thereof while being in engagement with the collars 106, 107. Shown at 110, 111 are end jigs secured to the rotary frame 102 at both ends thereof through annular fixing members 112, the end jigs including flange portions 110a, 111a to be coupled to press rings 108, 109 respectively and tube portions 110b, 111b, each adapted for one end portion thereof to be inserted into the molding tool 105, Shown at 113 is an auxiliary molding means for faucet interior molding, which is mounted at that one end of the end jig 111 which is opposed to one end of the molding tool 105. The auxiliary molding means 113 is position-variable between a protruded position for action toward faucet molding area 105a in the molding tool 105 and a retracted position in the end jig 111. It is made of same resilient material as the molding tool 105. Normally, it is so positioned as to be retracted by its own resiliency into the end jig 111. The operative surface 113a of this resilient auxiliary molder 113 has an annular projection 114 integrally formed therewith. Shown at 115 is a tubular operative element fitted in the tube portion 111b of the end jig 111 and movable in the direction of the axis 101. It is so adapted that it pushes the auxiliary molder 113 to oppose the latter to the faucet molding area 105a when it is protruded from the end jig 111 on the faucet side into the molding tool 105. Shown at 116 is a push-in means opposed to one end of the operative element 115. The push-in means 116 include a cylinder 117 and a floating roll 118 mounted to a piston rod of the cylinder 117 and abuttable to said one end of the operative element 115. The interior of the body of the molding tool 105 is so formed as to constitute a hollow chamber 119 which is loaded with such kinds of liquid 120 as fluoro-oil and oil added with a suitable powdery material for making it greater in specific gravity than resin. The hollow chamber 119 is so formed that no liquid leak may be caused. Since the hollow chamber 119 is of annular shape, the interior tube portion of the resilient molding tool is coupled to other tube portions by means of a suitable coupling member 121, or the hollow chamber 119 is formed of open-cell material so that the interior tube portion may be prevented from deformation due to gravity. In the tube portion 110b of the end jig 110 there is provided a liquid tank 122 which communicates with above said hollow chamber 119 through a plurality of passages 123. Numeral 124 designates a liquid inlet port.

Steps involved in a pipe molding operation employing this form of centrifugal molding apparatus and in a subsequent bending operation are substantially the same as those described with respect to the first embodiment. It is to be noted that the fact that the annular projection 114 of the auxiliary molding means 113 for faucet interior molding is pushed by the operative element 115 into the interior of the faucet 125a of the pipe 125 being formed results in the formation in the interior of the faucet 125a of a peripheral groove for fitting a ring seal. When carrying out centrifugal molding, even if any deformation due to errors or eccentricity which may have been caused to the rotary frame 102, intermediate frame 104 and/or molding tool 105 in the course of their manufacture is found with the interior of the molding tool 105, roundness can be satisfactorily achieved by the action of liquid introduced from the tank chamber 122 into the hollow chamber 119 through a passage 123. Further, it is to be noted that the drawing of the pipe after its having been bent can be easily accomplished by returning the liquid 120 in the hollow chamber 119 to the tank chamber 122 through the passage 123. For returning the liquid to the tank chamber 122, one method, among others, is that the interior of the molding tool 105 is subjected to the pressure of pressurized air.

Figure 12:
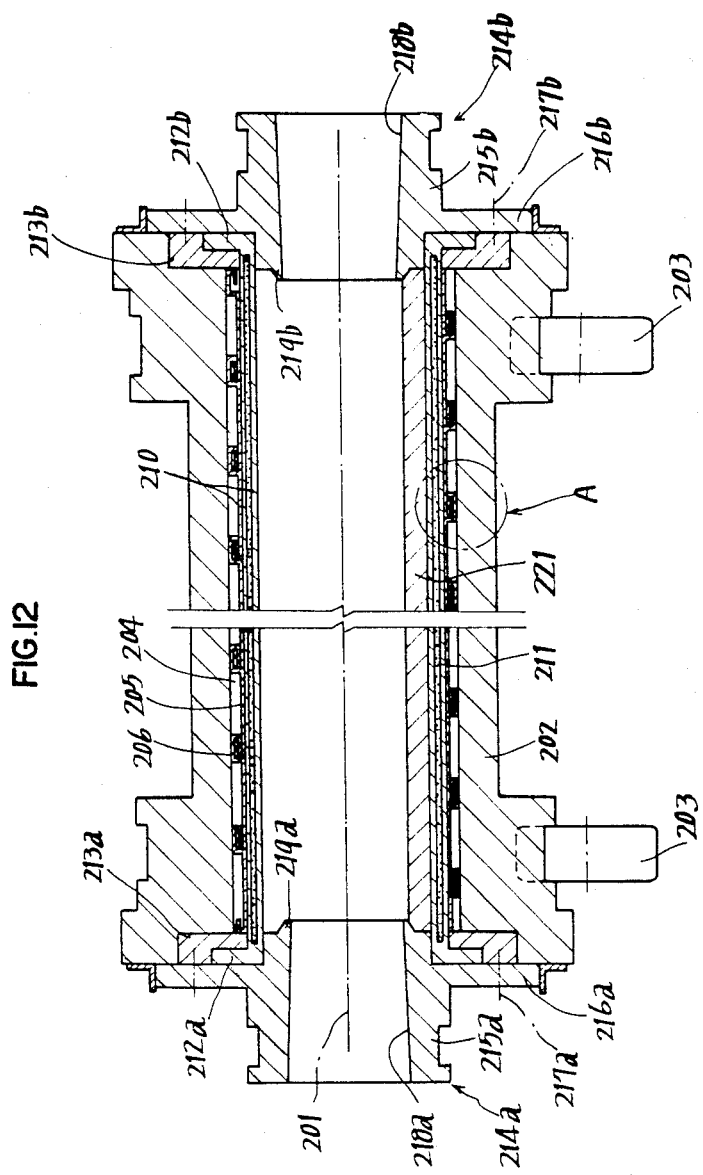
FIG. 12 is a longitudinal view in elevation of still another form of centrifugal molding apparatus.
Figure 13:
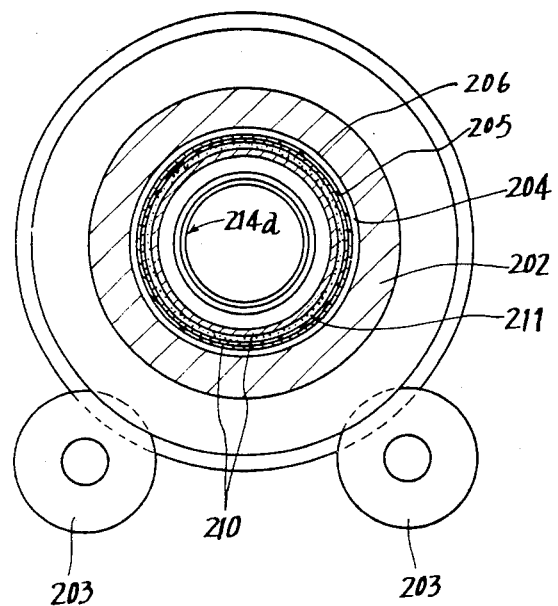
FIG. 13 is a transverse section in side elevation of FIG. 12.
Figure 14:
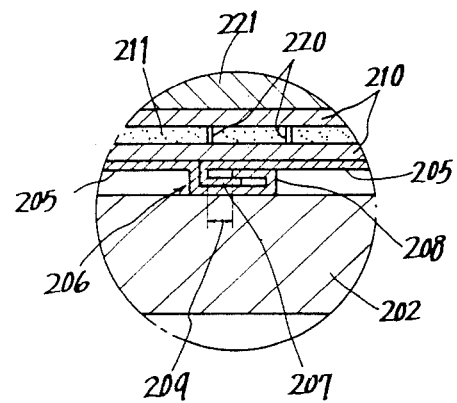
FIG. 14 is an enlarged view in section of the part indicated by arrow A in FIG. 12.

Still another embodiment is shown in FIGS. 12 to 17, inclusive. Referring to FIG. 12, there is provided a circumferentially multi-divisible rotary frame 202 supported by a plurality of rollers 203 for rotation about a horizontal axis of rotation, drive force for rotation being supplied by the rollers 203. Shown at 204 is an intermediate frame mountable in the interior of the rotary frame 202. As FIGS. 12 to 14 indicate, its body is formed of a spiral plate material 205, and spirally opposed side edges of the plate material 205 are joined by means of mating portions 206 slidable in the direction of the axis of rotation 201 within certain limits. One side edge of the plate material 205 is formed with an outwardly curved inner hook portion 207, and the other side edge is formed with an inwardly curved outer hook portion 208. These hook portions 207, 208 of adjacent edges mate with each other and, in their mating relationship as such, are adapted to be slidable within certain limits. Shown at 210 is a resilient-material-made molding tool to be incased in the interior of the intermediate frame 204. A hollow chamber in its body portion is loaded with liquid 211. The molding tool 210 shown has no faucet forming portion, but may be provided with a faucet forming portion in same manner as the other embodiments. Collars 212a, 212b are provided on the outer periphery of the molding tool 210 at the ends thereof. Numerals 213a, 213b are press rings to be fitted in at both ends of a rotary frame 202. They are in engagement with the collars 212a, 212b. Numerals 214a, 214b are end jigs to be mounted to the rotary frame 202 at both ends thereof. The end jigs 214a, 214b comprise tube portions 215a, 215b, one end each of which can be introduced into the molding tube 210, and collars 216a, 216b engageable with one end or the other of the rotary frame 202 and to be coupled to the press rings 213a, 213b by coupling elements 217a, 217b. Numerals 218a, 218b show the interior of tapered portions of the end jigs; 219a, 219b are annular projections; and 220 is a coupling member provided in the hollow chamber.

Figure 15:
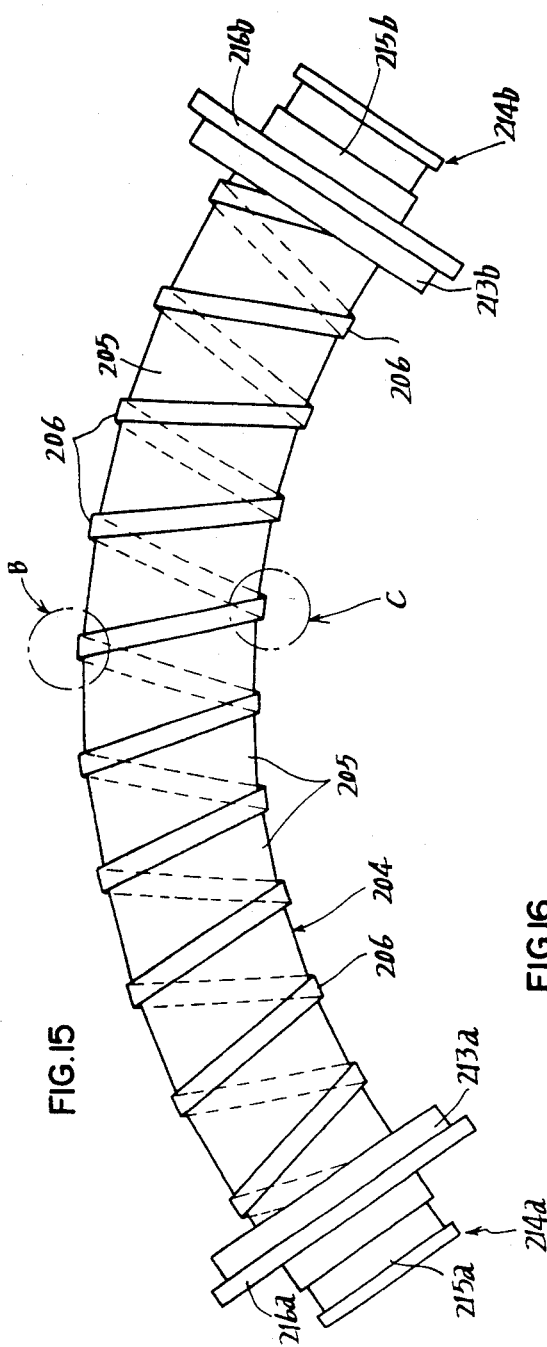
FIG. 15 is a front view showing the intermediate frame and molding tool in their bent state.
Figure 17:
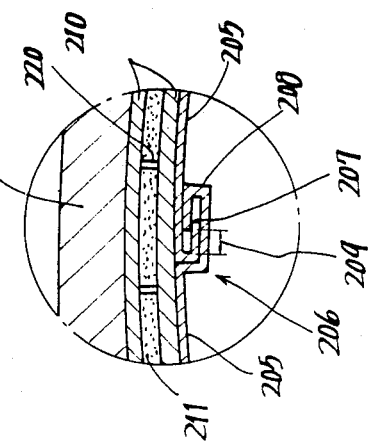
FIG. 17 is an enlarged sectional view of the part indicated by arrow C in FIG. 15.
Figure 16:
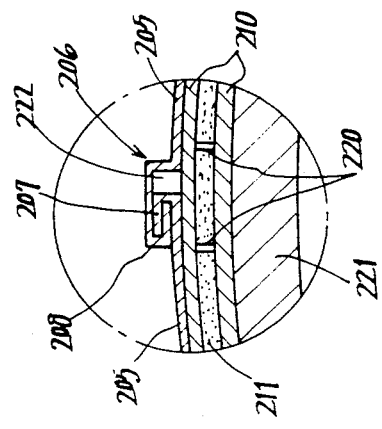
FIG. 16 is an enlarged sectional view of the part indicated by arrow B in FIG. 15.

The pipe molding process employing this form of centrifugal molding apparatus is substantially same as that in the case of the first embodiment, except that the faucet molding stage is not included. Upon completion of pipe molding, the rotary frame 202 is divided and the intermediate frame 204, the molding tool 210 and the molded pipe 221 are removed. The end jigs 214a, 214b are also removed integrally with them. After that, the entirety is bent, as FIG. 15 shows. In this connection, it is to be noted that as can be seen from FIG. 16, sliding within certain limits 222 takes place on the outer diameter side, so that the object under bending is elongated on that side to the extent that some clearance develops. The inner-diameter side is seen as having maintained the scope of certain limits 209. It follows that the bending of the pipe is performed by elongation on the outer diameter side and without contraction on the inner diameter side. After the pipe in the tool 210 has been bent and cured, the end jigs 214a, 214b are removed. The intermediate frame 204 is twisted in the direction reverse to the spiral direction so as to broaden its diameter and the molding tool is withdrawn. After that, the bent pipe is removed from the tool 210. In this connection, it may be added that at the time of drawing the liquid 211 is discharged, and that adjustment of molding tool diameter is done by adjusting the quantity of liquid 211.

What is claimed is:

1. A method of manufacturing bent pipes made up of a composite material comprising the steps of:
   rotating around a straight horizontal axis a substantially cylindrical resilient molding tool adapted to be deformed between a straight-axis profile and a bent-axis profile;
   feeding pipe forming materials into said molding tool;
   centrifugally molding in said molding tool a pipe made up of said pipe forming materials and at least having an inner wall, an outer wall and an uncured axially intermediate portion;
   inserting in the centrifugally molded pipe a flexible bag provided on its outer periphery with absorbent layer means, and inflating said bag so as to press said absorbent layer means against the inner wall of said molded pipe and to eliminate by said absorbent layer means the air or gas bubbles produced in the inner wall of said molded pipe;
   bending said molding tool so that said molded pipe is correspondingly bent therein; and
   removing the resulting bent pipe from said molding tool after the bent pipe has been wholly cured.

2. A method of manufacturing bent pipes as defined in claim 1 wherein the absorbent layer means comprises an absorbent layer of corrosion-resistant material provided on the outer periphery of said bag and a porous film of a solvent-resistant material provided on the outer periphery of said absorbent layer.

3. A method of manufacturing bent pipes as defined in claim 1 wherein said pipe forming materials comprise faster-curing resin liquid means for forming both ends of the pipe and slower-curing resin liquid means for forming the axially intermediate portion of the pipe between the ends thereof, whereby the molded pipe is cured at said ends but remains uncured at said axially intermediate portion prior to the bending operation.

4. A method of manufacturing bent pipes as defined in claim 1 wherein during the centrifugal operation said molding tool is held in position in an intermediate frame consisting of circumferentially divisible sections, and prior to the bending operation said molding tool is removed from said intermediate frame by separating at least one section of said intermediate frame from the other section or sections thereof.

5. A method of manufacturing bent pipes as defined in claim 4 wherein said molding tool and said intermediate frame are inserted in a rotary frame during the centrifugal molding operation.

6. A method of manufacturing bent pipes as defined in claim 1 wherein during the centrifugal operation said molding tool is held in position in a flexible intermediate frame consisting of a continuous strip helically wound into a substantially cylindrical form and having one side edge axially slidably engaging the other side edge, and said intermediate frame is subjected to bending together with said molding tool.

7. A method of manufacturing bent pipes as defined in claim 6 wherein said molding tool and said intermediate frame are inserted in a rotary frame during the centrifugal molding operation.

8. A method of manufacturing bent pipes as claimed in claim 1 wherein the liquid is discharged from said hollow space prior to the removal of said bent pipe from said molding tool.

9. A method of manufacturing bent pipes as claimed in claims 1 or 8 wherein the diameter of said molding tool is adjusted by varying the quantity of liquid in said hollow space.

10. A method of manufacturing bent pipes made up of a composite material comprising the steps of:
    rotating around a straight horizontal axis a substantially cylindrical resilient molding tool adapted to be deformed between a straight-axis profile and a bent-axis profile, said molding tool having inner and outer tubular wall portions and a hollow space between said wall portions;
    feeding pipe forming materials into said molding tool;
    centrifugally molding in said molding tool a pipe made up of said pipe forming materials and at least having an inner wall, an outer wall and an uncured axially intermediate portion, and filling said hollow space with liquid during the centrifugal molding;
    bending said molding tool so that the centrifugally molded pipe is correspondingly bent therein; and
    removing the resulting bent pipe from said molding tool after the bent pipe has been wholly cured.

11. A method of manufacturing bent pipes as defined in claim 10 wherein prior to the bending operation a flexible bag provided on its outer periphery with absorbent layer means is inserted into sid molded pipe and thereafter inflated so as to press said absorbent layer means against the inner wall of said molded pipe and to eliminate by said absorbent layer means the air or gas bubbles produced in the inner wall of said molded pipe.

12. A method of manufacturing bent pipes as defined in claim 11 wherein the absorbent layer means comprises an absorbent layer of corrosion-resistant materials provided on the outer periphery of said bag and a porous film of a solvent-resistant material provided on the outer periphery of said absorbent layer.

13. A method of manufacturing bent pipes as defined in claim 10 wherein said pipe forming materials comprise faster-curing resin liquid means for forming both ends of the pipe and slower-curing resin liquid means for forming the axially intermediate portion of the pipe between the ends thereof, whereby the molded pipe is cured at said ends but remains uncured at said axially intermediate portion prior to the bending operation.

14. A method of manufacturing bent pipes as defined in claim 10 wherein during the centrifugal operation said molding tool is held in position in an intermediate frame consisting of circumferentially divisible sections, and prior to the bending operation said molding tool is removed from said intermediate frame by separating at least one section of said intermediate frame from the other section or sections thereof.

15. A method of manufacturing bent pipes as defined in claim 14 wherein said molding tool and said intermediate frame are inserted in a rotary frame during the centrifugal molding operation.

16. A method of manufacturing bent pipes as defined in claim 10 wherein during the centrifugal operation said molding tool is held in position in a flexible intermediate frame consisting of a continuous strip helically wound into a substantially cylindrical form and having one side edge axially slidably engaging the other side edge, and said intermediate frame is subjected to bending together with said molding tool.

17. A method of manufacturing bent pipes as defined in claim 16 wherein said molding tool and said intermediate frame are inserted in a rotary frame during the centrifugal molding operation.

* * * * *

UNITED STATES PATENT AND TRADEMARK OFFICE
CERTIFICATE OF CORRECTION

PATENT NO. : 4,518,556

DATED : May 21, 1985

INVENTOR(S) : MASAHIKO YAMAMOTO et al

It is certified that error appears in the above—identified patent and that said Letters Patent is hereby corrected as shown below:

Col. 5, line 68, "molding" should read --molded--.

Col. 8, line 42, "is uncured" should read --in uncured--.

Col. 12, line 54 "sid" should read --said--.

Signed and Sealed this

Thirteenth Day of August 1985

[SEAL]

Attest:

DONALD J. QUIGG

Attesting Officer     Acting Commissioner of Patents and Trademarks